United States Patent [19]
Aoki

[11] Patent Number: 5,315,426
[45] Date of Patent: May 24, 1994

[54] OPTICAL TRANSMITTER

[75] Inventor: Yasubiro Aoki, Tokyo, Japan

[73] Assignee: NEC Corporation, Japan

[21] Appl. No.: 852,407

[22] Filed: Mar. 16, 1992

[30] Foreign Application Priority Data

Mar. 20, 1991 [JP] Japan .................. 3-81838

[51] Int. Cl.$^5$ ............................................ H04B 10/04
[52] U.S. Cl. ........................... 359/180; 359/160;
          359/162; 359/173; 359/182; 359/188
[58] Field of Search ............... 359/160, 162, 173, 174,
          359/176, 179, 180-182, 183-184, 187-188

[56] References Cited

U.S. PATENT DOCUMENTS

| | | | |
|---|---|---|---|
| 4,903,339 | 2/1990 | Solomon | 359/162 |
| 4,989,212 | 1/1991 | Mecherle | 359/183 |
| 5,058,976 | 10/1991 | DiGiovanni et al. | 359/173 |
| 5,117,196 | 5/1992 | Epworth et al. | 319/174 |
| 5,166,821 | 11/1992 | Huber | 359/188 |

Primary Examiner—Richard E. Chilcot, Jr.
Assistant Examiner—K. Negash
Attorney, Agent, or Firm—Laff, Whitesel, Conte, Saret

[57] ABSTRACT

An optical transmitter includes a semiconductor laser which is supplied with a frequency modulated current. An emitted light from the semiconductor laser is modulated in intensity by an intensity modulator in accordance with an information signal and becomes a signal light pulse. The spectral width $\Delta v_m$ of the light and a power $P_s$ of the signal light pulse meet the following formulas:

$$P_s > P_{th} \text{ and}$$

$$\frac{\Delta v_m + \Delta v_B}{\Delta v_s + \Delta v_B} \geq \frac{P_s}{P_{th}}$$

where $P_{th}$ is a threshold input light power when the stimulated Brillouin scattering begins to occur in the optical fiber in case of no frequency modulation of said light, $\Delta v_B$ is the Brillouin gain bandwidth of the optical fiber, and $\Delta v_s$ is the spectral width of the signal light in case of no frequency modulation of the light.

3 Claims, 2 Drawing Sheets

OPTICAL TRANSMITTER

FIELD OF THE INVENTION

This invention relates to an optical transmitter, and more particularly to, an optical transmitter used in an optical fiber communication system.

BACKGROUND OF THE INVENTION

The conventional optical communication system includes an optical transmitter provided with a semiconductor laser. The semiconductor laser is intensity-modulated by changing injection current corresponding to an information signal, so that the semiconductor emits a modulated laser light including the information signal. Such a modulation system is called as a direct modulation system. The modulated laser light emitted from the semiconductor laser is transmitted through an optical fiber and reaches an optical receiver. The optical receiver detects the modulated laser light and discriminates the information signal therefrom. In this conventional optical communication system, there occurs a frequency chirping in the modulated laser light, so that the information signal discriminated from the modulated laser light may deteriorate on certain conditions.

In the state of the art of optical communication system, a laser light is modulated in intensity by an external modulator in accordance with an information signal after being emitted from a semiconductor laser. The external modulator consists of a compound semiconductor such as InGaAsP or LiNbO$_3$.

Such a modulation system is called as an external modulation system. Typical example of this optical communication system has been disclosed on pages 1357 to 1362 of "IEEE Journal of Lightwave Technology, vol. 8, 1990". Further, an optical fiber amplifier provided with an Er-doped optical fiber as an amplifying medium has been disclosed on pages 1175 to 1192 of "Japanese Journal of Applied Physics, vol. 59, 1990". Consequently, it has been realized to obtain an optical communication system having an output power over 20 dBm with little frequency chirping.

According to the conventional optical transmitters described above, however, there is a disadvantage in that the input signal light power is limited because of occurrence of the stimulated Brillouin scattering. The reason why the stimulated Brillouin scattering occurs has been described on page 2489 of "Applied Optics, vol. 11, 1972" and on page 710 of "IEEE Journal of Lightwave Technology, vol. 6, 1988". The stimulated Brillouin scattering is induced by a high intensity energy of the signal light to be transmitted in a single-mode optical fiber which has a core of a small diameter provided in the optical communication system. The stimulated Brillouin scattering tends to occur when an input signal light having little frequency chirping is coupled in an optical fiber, because the Brillouin gain bandwidth of the optical fiber is less than 100 MHz. If the stimulated Brillouin scattering occurs, most of the signal light is converted to a stimulated Brillouin scattering light and scattered backward toward the input facet of the optical fiber, so that the transmission signal power is reduced. In other words, even if the input signal power is increased, the signal power which reaches the optical receiver can not increase, so that the effective transmission length is limited. Further, the power level change of the signal light detected by the optical receiver occurs if the stimulated Brillouin scattering occurs. Therefore, it is required to avoid the stimulated Brillouin scattering to realize a long distance optical communication by increasing the transmission power level.

SUMMARY OF THE INVENTION

Accordingly, it is an object of the invention to provide an optical transmitter in which the stimulated Brillouin scattering does not occur even if a laser light having a high power is coupled in an optical fiber.

According to a feature of the invention, an optical transmitter comprises:

means for emitting a light;

means for supplying a current modulated in frequency to the emitting means to be thereby driven;

means for modulating the light in intensity in accordance with an information signal to generate a signal light pulse; and means for supplying the signal light pulse to an optical fiber;

wherein a spectral width $\Delta \nu_m$ and a power $P_s$ of the signal light pulse meet the following formulas:

$$P_s > P_{th} \text{ and}$$

$$\frac{\Delta \nu_m + \Delta \nu_B}{\Delta \nu_s + \Delta \nu_B} \geq \frac{P_s}{P_{th}}$$

where $P_{th}$ is a threshold input light power when the stimulated Brillouin scattering begins to occur in the optical fiber in case of no frequency modulation of the light, $\Delta \nu_B$ is the Brillouin gain bandwidth of the optical fiber, and $\Delta \nu_s$ is the spectral width of the signal light in case of no frequency modulation of the light.

BRIEF DESCRIPTION OF THE DRAWINGS

The invention will be explained in more detail in conjunction with appended drawings wherein.

DESCRIPTION OF THE PREFERRED EMBODIMENTS

Figure 1:
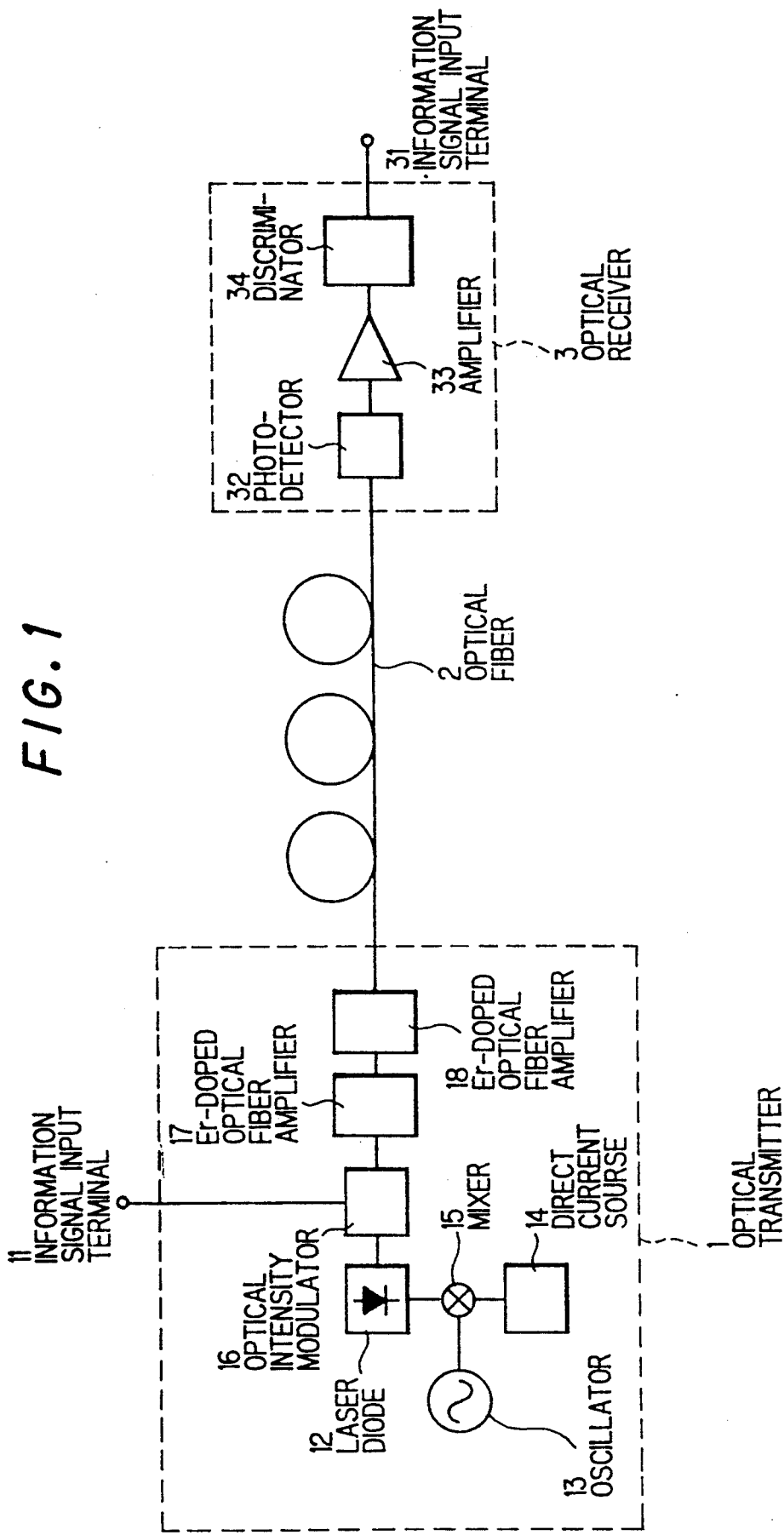
FIG. 1 is a block diagram of an optical communication system including an optical transmitter in a first preferred embodiment according to the invention.

First, the principle of the invention wil be explained. The stimulated Brillouin scattering is an effect of an optical scattering due to acoustic phonons generated within an optical fiber. If an intensity modulated signal light having a spectral width $\Delta \nu_s$ is transmitted through an optical fiber, a threshold input power $P_{th}$ of the intensity modulated signal light is given approximately by the following formula (1):

$$P_{th} = \frac{21 \cdot M \cdot \alpha_s \cdot A_e \cdot K}{g_B(1 - \exp(-\alpha_s L))} \cdot \frac{\Delta \nu_s \quad \Delta \nu_B}{\Delta \nu_B} \quad (1)$$

Where $g_B$ is a peak gain coefficient of the stimulated Brillouin scattering, $\alpha_s$ is a loss coefficient of an optical fiber at a wavelength of a signal light to be transmitted through the optical fiber, L is a length of the optical fiber, $A_e$ is an effective area of the optical fiber, K is a constant dependent on the polarization preservation characteristic of the optical fiber (usually K=2), $\Delta \nu_s$ is the spectral width of the signal light without frequency modulation, $\Delta\nu_B$ is the Brillouin gain bandwidth of the optical fiber, and M is a constant dependent on a bit rate of the signal light (M=1 for bit rates under 100 Mb/s and M=2 for over 100 Mb/s) as described on page 2489 of "Applied Optics, vol. 11, 1972", and page 710 of "IEEE Journal of Lightwave Technology, vol. 6, 1988", "  " denotes the convolution, which is usually given approximately by a sum of $\Delta\nu_s$ and $\Delta\nu_B$.

The stimulated Brillouin scattering occurs remarkably when the input signal light power is greater than $P_{th}$. On the other hand, the stimulated Brillouin scattering scarcely occurs when the input signal light power is below $P_{th}$ and can be ignored. Therefore, $P_{th}$ given by the formula (1) represents the upper limit of the input signal light power in which transmission of the signal light can be carried out without occurrence of the stimulated Brillouin scattering.

If the spectral width $\Delta\nu_s$ is broadened to $\Delta\nu_m$ frequency modulation, the threshold input power $P_{th}$ becomes $P_{th}'$ given by the following formula (2):

$$P_{th}' = \frac{21 \cdot M \cdot \alpha_s \cdot A_e \cdot K}{g_B(1 - \exp(-\alpha_s L))} \cdot \frac{\Delta\nu_m + \Delta\nu_B}{\Delta\nu_B}$$
$$= P_{th} \cdot \frac{\Delta\nu_m + \Delta\nu_B}{\Delta\nu_s + \Delta\nu_B} \quad (2)$$

As understood by the formula (2), $P_{th}'$ becomes large when the spectral width $\Delta\nu_m$ is broadened by frequency modulation. That means it is possible to increase the upper limit of the input signal light power by frequency modulation. For example, when $\Delta\nu_B=100$ MHz and $\Delta\nu_s=20$ MHz, $P_{th}'$ increases to 9 $P_{th}$ by increasing $\Delta\nu_m$ to 1 GHz. That means the maximum input power (=$P_{th}'$) becomes 9 times larger than the conventional input signal light power limit (=$P_{th}$).

In general, it is possible to avoid occurrence of the stimulated Brillouin scattering even if the input power $P_s$ is larger than $P_{th}$, by broadening the spectral width to meet the following formula (3):

$$\frac{\Delta\nu_m + \Delta\nu_B}{\Delta\nu_s + \Delta\nu_B} \geq \frac{P_s}{P_{th}} \quad (3)$$

By the way, the stimulated Brillouin scattering occurs mainly within several ten km from the input facet of the optical fiber, because the loss $\alpha_s$ of the optical fiber is 0.2 to 0.5 dB/km within a wavelength range of 1.3 to 1.6 $\mu$m. Therefore, the period of the frequency modulation should be shorter than a time when the signal light travels the length shown above, that is approximately 0.1 ms. In other word, the modulation frequency should be set to be greater than 10 kHz. On the other hand, the transmission characteristic of the signal light may deteriorate because of the optical fiber dispersion if the amount of the frequency modulation is large. Therefore, it is preferable to set the amount of the frequency modulation to be a minimum on a condition that the stimulated Brillouin scattering does not occur. In practice, it is expected that the threshold input signal light power becomes over ten times of that having no frequency modulation, and there is little influence of the dispersion due to broadening of $\Delta\nu_m$ to several GHz, as explained before.

Next, an optical transmitter in a first preferred embodiment will be explained. FIG. 1 shows an optical communication system which includes an optical transmitter 1 in the first preferred embodiment, an optical fiber 2 through which an optical signal supplied from the optical transmitter 1 is transmitted, and an optical receiver 3 which detects the optical signal supplied from the optical transmitter 1 through the optical fiber 2.

The optical transmitter 1 includes a laser diode 12 which is a distributed feed-back (DFB) laser diode of InGaAsP/InP emitting a laser light having the wavelength of 1.555 $\mu$m, an oscillator 13 which generates sine waves having a frequency of 15 MHz, a direct current source 14 which supplies a direct current, a mixer which mixes the sine waves supplied from the oscillator 13 and the direct current supplied from the direct current source 14 to be supplied to the laser diode 12, an optical intensity modulator 16 of a travelling-wave type including LiNbO$_3$ having a modulation band width of approximately 10 GHz which modulates the laser light emitted from the laser diode 12 in intensity in accordance with an information signal supplied from an information signal input terminal 11, and Er-doped optical fiber amplifiers 17 and 18 each of which is an optical fiber boosting amplifier which includes an Er-doped single-mode optical fiber of InGaAsP/InP having a core diameter of 5 $\mu$m, a length of 30 m and an Er concentration of 400 ppm excited by a Fabry-Perot type semiconductor laser having a wavelength bandwidth of 1.48 $\mu$m. The maximum exciting input powers of the Er-doped optical fiber amplifiers 17 and 18 are 70 mW and 20 mW, respectively.

The optical fiber 2 is a dispersion shifted single mode silica optical fiber having a length of 200 km, a loss rate of 0.21 dB/km at a wavelength of 1.555 $\mu$m, and a dispersion of approximately 1 ps/nm/km.

The optical receiver 3 includes a photodetector 32 which is an avalanche photodiode of InGaAs which detects the modulated laser light transmitted through the optical fiber 2, an amplifier 33 which amplifies the modulated laser light, and a discriminator 34 which discriminates the information signal from the modulated laser light to be supplied to an information signal output terminal 31.

For operation, a laser light emitted from the laser diode 12 is modulated in intensity by the optical intensity modulator 16 in accordance with the information signal of voltage pulses of 5 Gb/s having a RZ code. An average power of the modulated laser light is approximately $-10$ dBm, however, the modulated laser light is amplified by the Er-doped optical fiber amplifiers 17 and 18 to have an average power of 20 dBm to be supplied to the optical fiber 2. The modulated laser light is transmitted through the optical fiber 2 and reaches the optical receiver 3. The modulated laser light is detected by the photodetector 32, and then amplified by the amplifier 33. The information signal is discriminated from the amplified laser light by the discriminator 34 to be supplied to the information signal output terminal 31.

In the present optical communication system, the spectral width $\Delta\nu_s$ of the laser diode 12 is 10 MHz, the Brillouin gain bandwidth $\Delta\nu_B$ of the optical fiber 2 is 50 MHz, and the stimulated Brillouin scattering threshold $P_{th}$ in case of no modulation is 8 dBm. The transmitting power level of the optical transmitter 1 is 20 dBm. In order to avoid occurrence of the stimulated Brillouin scattering in the transmitting power level of 20 dBm, the spectral width $\Delta\nu_s$ of the laser diode 12 is broadened to be $\Delta\nu_m$ of 2 GHz. The frequency modulation current in accordance with the sine waves supplied from oscillator 13 is approximately 4 mA for broadening the spectral width $\Delta v_s$ to $\Delta v_m$ of 2 GHz. In this case, the stimulated Brillouin scattering threshold $P_{th}'$ estimated from the formula (2) becomes 23.3 dBm. As predicted, there is observed no occurrence of the stimulated Brillouin scattering at the transmitting output level of 20 dBm.

Next, the level diagram of the optical communication system using the optical transmitter 1 will be explained. The transmitting output level is 20 dBm, and the loss of the optical fiber 2 having a length of 200 km in whole length is 42 dB, so that the signal power level detected at the photodetector 32 is −22 dBm. On the other hand, the receiving sensibility of the optical receiver is −27 dBm at the error rate of $10^{-11}$, so that the margin is 5 dB in case of the transmission length of 200 km. In addition, there is observed no reduction in the receiver sensibility in the received signal compared with the case before transmission. On the other hand, the stimulated Brillouin scattering occurs intensively if the frequency modulation is not carried out as in case of the conventional optical communication systems, so that the received signal power level becomes less than −30 dBm after transmission of 200 km. Further, error rates lower than $10^{-6}$ were never obtained without frequency modulation.

Figure 2:
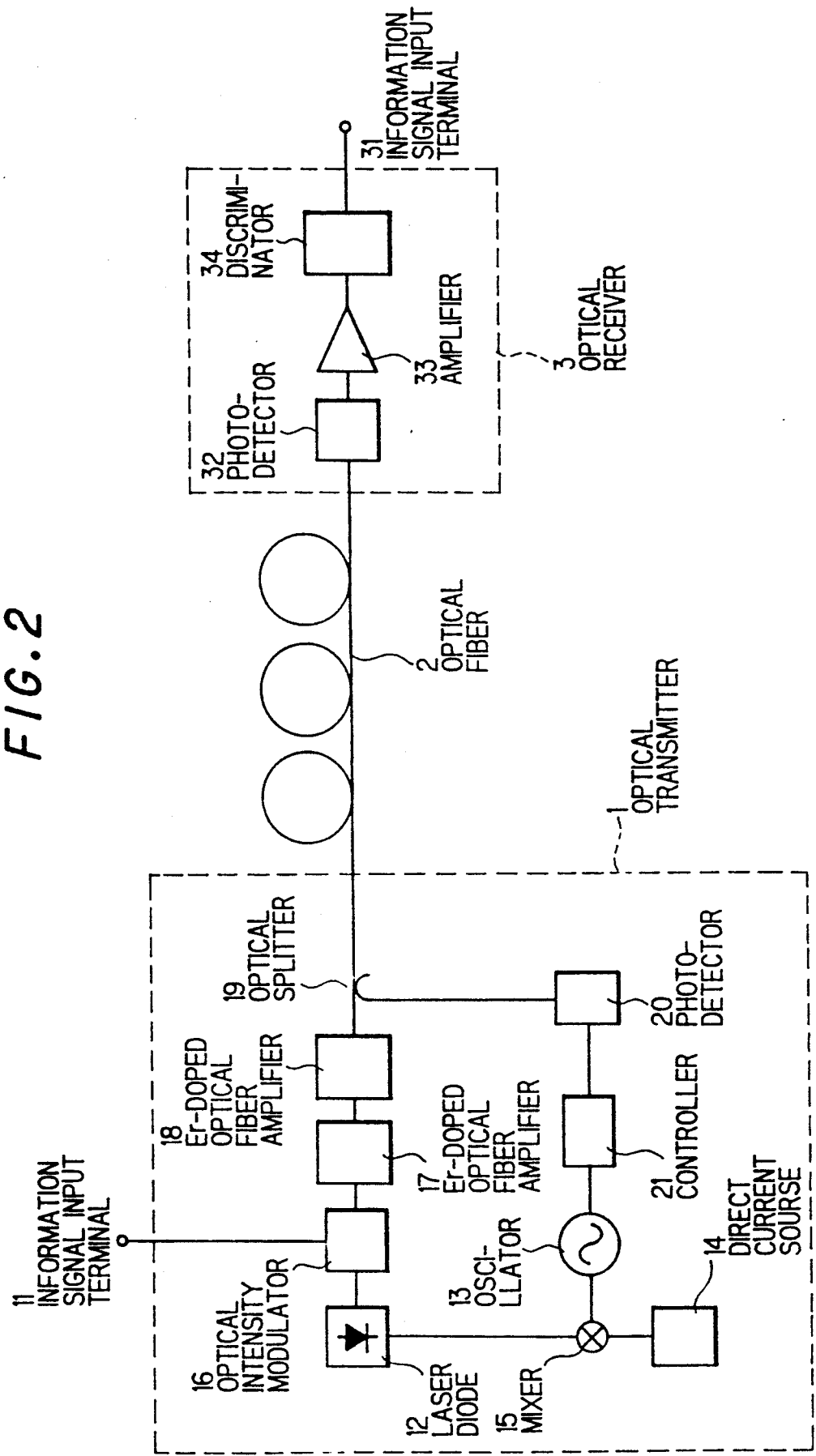
FIG. 2 is a block diagram of an optical communication system including an optical transmitter in a second preferred embodiment according to the invention.

FIG. 2 shows an optical communication system including an optical transmitter 1 in a second preferred embodiment according to the invention. The basic configuration of the optical communication system is the same as shown in FIG. 1, except that the optical transmitter 1 also includes an optical splitter 19 which is a single mode optical fiber coupler having a splitting ratio of 20:1 which splits the modulated laser light supplied from the Er-doped optical fiber amplifier 18, a photodetector 20 which is a photodiode of InGaAs which detects the modulated laser light through the optical splitter 19, and a controller 21 which controls the output of the oscillator 13 in accordance with an output of the photodetector 20.

In this optical communication system, an optical power level of the backward scattered light is monitored by the photodetector 20, and the controller 21 controls the output of the oscillator 13 not to exceed −30 dBm in accordance with the output of the photodetector 20. Therefore, the degree of the frequency modulation is set to be approximately a minimum on a condition that the stimulated Brillouin scattering does not occur. In this preferred embodiment, $\Delta v_m$ is 0.9 GHz. The margin is 5 dB in case of the transmission length of 200 km, which is the same as in the first preferred embodiment. An advantage to minimize the degree of the frequency modulation is not evidently observed in a transmission system having a length of 200 km as like in the second preferred embodiment, because the influence of the dispersion is small. However, it is expected that such a minimization of the degree of the frequency modulation may be effective in a transmission system having a length of longer 1000 km using a plurality of optical amplifiers. In the preferred embodiments, the frequency modulating means is one of direct frequency modulation type, however, an optical phase modulator may be adopted instead of the direct frequency modulation.

As explained above, the spectral width of the laser light emitted by the laser diode can be changed independent on the bit rate, etc., so that it is realized to avoid occurrence of the stimulated Brillouin scattering by broadening the spectral width of the signal light practically by the frequency modulation. Therefore, the stimulated Brillouin scattering does not occur even if the transmission power level is increased, so that there is an advantage in that a longer optical transmission can be carried out by the optical communication system using the optical transmitter in the preferred embodiments according to the invention as compared with the conventional communication system.

Although the invention has been described with respect to specific embodiment for complete and clear disclosure, the appended claims are not to thus limited and alternative constructions that may occur to one skilled in the art which fairly fall within the basic teaching herein set forth.

What is claimed is:

1. An optical transmitter, comprising:
    means for emitting a light:
    means for supplying a current modulated in frequency to said emitting means to be thereby driven;
    means for modulating said light in intensity in accordance with an information signal to generate a signal light pulse; and
    means for supplying said signal light pulse to an optical fiber;
    wherein a spectral width $\Delta v_m$ and a power $P_s$ of said signal light pulse meet the following formulas:

$$P_s > P_{th} \text{ and}$$

$$\frac{\Delta v_m + \Delta v_B}{\Delta v_s + \Delta v_B} \geqq \frac{P_s}{P_{th}}$$

where $P_{th}$ is a threshold input light power when the stimulated Brillouin scattering begins to occur in said optical fiber in case of no frequency modulation of said light, $\Delta v_B$ is the Brillouin gain bandwidth of said optical fiber, and $\Delta v_s$ is the spectral width of said signal light in case of no frequency modulation of said light.

2. An optical transmitter, according to claim 1, wherein:
    said emitting means is a semiconductor laser; and
    said current supplying means comprises a direct current source which generates a direct current, an oscillator which generates an oscillated signal, and a mixer which mixes said oscillated signal with said direct current to generate a frequency modulated current to be supplied to said emitting means;
    wherein said emitting means supplies said light which is modulated in frequency in accordance with said mixed current supplied from said mixer.

3. An optical transmitter, according to claim 1, further comprising:
    means for splitting some part of said signal light pulse from said optical fiber;
    means for detecting said some part of said signal light to generate a detecting signal; and
    means for controlling said oscillated light supplied from said oscillator in accordance with said detecting signal so that the degree of said frequency modulation of said light is minimum so far as said stimulated Brillouin scattering does not occur.

* * * * *